United States Patent
Zhang et al.

(10) Patent No.: US 12,440,121 B2
(45) Date of Patent: Oct. 14, 2025

(54) APPARATUS AND METHODS FOR MONITORING CONCENTRATIONS OF ANALYTES IN BODY FLUID

(71) Applicant: The Chinese University of Hong Kong, Hong Kong (CN)

(72) Inventors: Li Zhang, Hong Kong (CN); Wai Yan Philip Chiu, Hong Kong (CN); Kai Fung Chan, Hong Kong (CN); Xianfeng Xia, Hong Kong (CN); Xingzhou Du, Hong Kong (CN); Chong Zhang, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 116 days.

(21) Appl. No.: 16/992,761

(22) Filed: Aug. 13, 2020

(65) Prior Publication Data

US 2022/0047180 A1    Feb. 17, 2022

(51) Int. Cl.
*A61B 5/00* (2006.01)
*A61B 5/07* (2006.01)
(Continued)

(52) U.S. Cl.
CPC ............ *A61B 5/073* (2013.01); *A61B 5/0028* (2013.01); *A61B 5/1451* (2013.01); *A61B 5/14865* (2013.01); *A61B 2560/0214* (2013.01); *A61B 2560/0271* (2013.01); *A61B 2560/0406* (2013.01)

(58) Field of Classification Search
CPC ..... A61B 5/073; A61B 5/0028; A61B 5/1451; A61B 5/14865; A61B 2560/0214; A61B 2560/0271; A61B 2560/0406
See application file for complete search history.

(56) References Cited

U.S. PATENT DOCUMENTS

| 6,285,897 B1 | 9/2001 | Kilcoyne et al. |
| 7,020,531 B1 | 3/2006 | Colliou et al. |

(Continued)

FOREIGN PATENT DOCUMENTS

| CN | 1299058 A | 6/2001 |
| CN | 1700879 A | 11/2005 |

(Continued)

OTHER PUBLICATIONS

Kulkarni T, Slaughter G. Application of Semipermeable Membranes in Glucose Biosensing. Membranes (Basel). Dec. 14, 2016;6(4): 55. doi: 10.3390/membranes6040055. PMID: 27983630; PMCID: PMC5192411. (Year: 2016).*

(Continued)

*Primary Examiner* — Alex M Valvis
*Assistant Examiner* — Grace L Rozanski
(74) *Attorney, Agent, or Firm* — SALIWANCHIK, LLOYD & EISENSCHENK (57) ABSTRACT

The subject invention pertains to a novel system capable of long-term monitoring the concentration of a typical analyte in body fluid. The invention includes an untethered battery-free concentration monitor and an external data recorder to continuously measure the concentration of certain analytes and send out signals corresponding to the measured analytes concentration in real-time.

13 Claims, 7 Drawing Sheets

(51) Int. Cl.
*A61B 5/145* (2006.01)
*A61B 5/1486* (2006.01)

(56) References Cited

U.S. PATENT DOCUMENTS

| | | | |
|---|---|---|---|
| 7,245,954 B2 | 7/2007 | Glukhovsky | |
| 7,654,985 B2 | 2/2010 | Dinsmoor et al. | |
| 8,219,171 B2 | 7/2012 | Benoist | |
| 9,913,575 B2* | 3/2018 | Gazdzinski | A61B 1/31 |
| 11,122,965 B2* | 9/2021 | Valdastri | A61B 5/062 |
| 11,241,166 B1* | 2/2022 | Lee | A61B 5/073 |
| 2002/0042562 A1* | 4/2002 | Meron | A61B 5/00 |
| 2004/0133089 A1 | 7/2004 | Kilcoyne et al. | |
| 2005/0182342 A1 | 8/2005 | Dinsmoor et al. | |
| 2005/0245788 A1 | 11/2005 | Gerber | |
| 2006/0231110 A1 | 10/2006 | Mintchev | |
| 2006/0270940 A1 | 11/2006 | Tsukashima et al. | |
| 2007/0225576 A1 | 9/2007 | Brown et al. | |
| 2008/0091177 A1 | 4/2008 | Christian | |
| 2008/0097182 A1* | 4/2008 | Schostek | A61B 5/073 600/371 |
| 2008/0234599 A1 | 9/2008 | Chiao et al. | |
| 2010/0200429 A1 | 8/2010 | Tsugawa et al. | |
| 2011/0040211 A1 | 2/2011 | Addington et al. | |
| 2012/0203084 A1* | 8/2012 | Li | A61B 5/073 600/309 |
| 2012/0245444 A1 | 9/2012 | Otis et al. | |
| 2013/0030263 A1* | 1/2013 | Parzart | 600/309 |
| 2013/0080119 A1* | 3/2013 | Khait | A61B 5/073 702/194 |
| 2014/0107726 A1* | 4/2014 | Voznesensky | A61B 5/4255 607/40 |
| 2015/0297116 A1 | 10/2015 | Kilcoyne et al. | |
| 2015/0343144 A1* | 12/2015 | Altschul | A61M 31/002 604/503 |
| 2016/0380708 A1* | 12/2016 | Dua | H04W 52/18 375/219 |
| 2017/0027520 A1* | 2/2017 | Terry | A61B 5/073 |
| 2017/0265803 A1* | 9/2017 | Copty | A61B 5/0036 |
| 2017/0311894 A1 | 11/2017 | Nadeau et al. | |
| 2018/0078195 A1* | 3/2018 | Sutaria | A61B 5/068 |
| 2018/0168490 A1* | 6/2018 | Jones | A61B 5/073 |
| 2018/0233761 A1* | 8/2018 | Slaughter | A61B 5/0031 |
| 2019/0262605 A1* | 8/2019 | Babakhani | A61N 1/37205 |
| 2019/0274598 A1* | 9/2019 | Scott | A61B 5/14503 |
| 2020/0143926 A1* | 5/2020 | Euliano | G16H 20/10 |
| 2020/0157360 A1* | 5/2020 | Lin | C12Q 1/001 |
| 2021/0000345 A1* | 1/2021 | Felix | A61B 5/0022 |
| 2021/0137412 A1* | 5/2021 | Sharma | A61B 5/1112 |
| 2021/0184712 A1* | 6/2021 | Kim | H04B 13/005 |
| 2021/0361940 A1* | 11/2021 | Yeh | H01G 4/35 |
| 2022/0022736 A1* | 1/2022 | Duan | A61B 1/041 |
| 2023/0035334 A1* | 2/2023 | Everman | A61B 5/486 |

FOREIGN PATENT DOCUMENTS

| | | | |
|---|---|---|---|
| CN | 101406410 A | * | 4/2009 |
| CN | 201275065 Y | | 7/2009 |
| CN | 101711673 A | | 5/2010 |
| CN | 201505133 U | | 6/2010 |
| CN | 101802601 A | | 8/2010 |
| CN | 102031283 A | | 4/2011 |
| CN | 102724907 A | | 10/2012 |
| CN | 203016952 U | | 6/2013 |
| CN | 103826528 A | | 5/2014 |
| CN | 105552466 A | | 5/2016 |
| CN | 105899132 A | | 8/2016 |
| CN | 106099150 A | | 11/2016 |
| CN | 106104264 A | | 11/2016 |
| GB | 1394171 A | | 5/1975 |

OTHER PUBLICATIONS

Office Action dated Apr. 13, 2023 in Chinese Application No. 202011307281.7.
International Search Report dated Oct. 25, 2021 in International Application No. PCT/CN2021/107541.
Office Action dated Oct. 12, 2023 in Chinese Application No. 202011307281.7.
Office Action dated Apr. 27, 2024 in Chinese Application No. 202011307281.7.

* cited by examiner

APPARATUS AND METHODS FOR MONITORING CONCENTRATIONS OF ANALYTES IN BODY FLUID

BACKGROUND OF THE INVENTION

Integrated circuits, advanced materials and biomedical technology enable nano-watt level platforms and miniature circuits for the in-situ detection of biomarkers in body fluids. Specifically, wearable devices, like smart watches equipped with an electrocardiogram (ECG) and a photoplethysmogram (PPG) are capable of measuring heart rate, heart rate variability, blood pressure, and body temperature simultaneously. Moreover, electronic skin embedded with electrochemical sensors provides the opportunity to detect non-invasively in sweat certain biomarkers, like glucose, lactate, and pH.

Compared with sweat, fluids in the gastrointestinal (GI) tract have more biomarkers including hormones, proteins, and a diverse microbiome. Current medical devices equipped with electrochemical sensors provide opportunities for the in situ detection of certain biomarkers in a non-invasive fashion. However, these devices embedded with conventional batteries all suffer from limited operation time because of high sampling rate and power consumption. Although rechargeable Lithium-ion (Li-ion) batteries have been used to prolong the shelf life of some medical devices, Lithium-ion batteries have safety issues related to the risk of self-ignition and the potential leakage of toxic materials.

The emergence of ingestible electronics opens a new window for monitoring valuable physiological information related to gut health in a non-invasive method. However, current human-interfaced medical devices (HIMDs), like electronic skin and ingestible electronics, still rely on batteries. Because high sampling rates, electrochemical sensing, and wireless data transmission are highly power consumable, these HIMDs all suffer from limited operation time while long-term monitor is important to provide more data for more accurate diagnoses. Although rechargeable Li-ion batteries have been used in some medical devices the safety issues related to self-ignition and leakage of harmful materials inhibit its application, especially, in ingestible electronics. Moreover, sizes of ingestible electronics are associated with the risk of intestinal obstruction while the bulky batteries eliminate the potential for further miniaturization.

BRIEF SUMMARY OF THE INVENTION

Provided are medical devices for remote sensing and in vivo measurement of concentrations of analytes in body fluids. The devices of the invention are capable of long-term monitoring of the concentrations of typical analytes in body fluids without any built-in batteries, are non-invasive and inexpensive. In some embodiments, the devices are remote concentration monitor y systems that comprise battery-free concentration monitors powered by energy harvested from the body fluids.

In some embodiments, the remote concentration monitor systems comprise an untethered battery-free concentration monitor and an external data recorder capable of receiving data from the concentration monitor. In preferred embodiments, the monitor is inside a body of a subject.

In some embodiments, the external data recorder is capable of receiving data from the in vivo concentration monitor. In some embodiments, the concentration monitor comprises one or more pairs of anodes and cathodes attached on a surface of the monitor and an encapsulated circuit powered by energy harvested from a body fluid through the electrodes.

In some embodiments, the encapsulated circuit comprises a concentration-adaptive energy harvest circuit, a wireless communication module, and a storage element selected from a capacitor and a super capacitor. In preferred embodiments, the wireless communication module is a radio frequency (RF) transmitter.

Advantageously, the voltage generated at the electrodes of the galvanic cell of the device drives the RF transmitter that transmits a signal to an external signal recorder that decodes the frequency of the received signal into concentration data of an analyte present at the electrodes of the galvanic cell and, optionally, displays the concentration data on a screen.

DETAILED DISCLOSURE OF THE INVENTION

Provided are medical devices for a remote sensing system for the in vivo measurement of the concentration of certain analytes in body fluids using battery-free concentration monitors powered by energy harvested from the body fluids. Advantageously, the untethered battery-free devices of the instant invention are capable of long-term monitoring of the concentrations of typical analytes in body fluids without any built-in batteries, are non-invasive and inexpensive.

In some embodiments, the invention provides systems comprising an untethered battery-free concentration monitor and a data recorder.

In some embodiments, the untethered battery-free concentration monitor comprises one or more pairs of anodes and cathodes attached to the surface of the monitor and an encapsulated circuit.

In preferred embodiments, the untethered battery-free concentration monitor is present within a subject and the data recorder is outside or external to the subject.

In further preferred embodiments, the untethered battery-free concentration monitor measures a concentration of at least analyte in real-time without any built-in batteries, the encapsulated circuit transmits signals generated based on the concentrations of the analytes, and the remote data recorder receives the signals, stores and analyzes the signal to generate data and, optionally displays the signal data on a screen.

In some embodiments, the untethered battery-free concentration monitor is a miniature monitor. In preferred embodiments, the untethered battery-free concentration miniature monitor is present on a chip. The overall dimension of the concentration monitor chip is subjected to the biocompatibility of the electrodes. In some embodiments, the electrodes of the concentration monitor are metal foils, like copper, zinc, iron, magnesium, silver, gold, and platinum. In some embodiments, the thickness of the electrodes is between 0.05 mm and 5 mm. In some embodiments, the electrode thickness is about 0.08 mm to about 4.8 mm; about 0.1 mm to about 4.5 mm; about 0.15 mm to about 4 mm; about 0.2 mm to about 3.5 mm; about 0.3 mm to about 3 mm; about 0.4 mm to about 2.5 mm; about 0.5 mm of about 2 mm; about 0.6 mm to about 1.5 mm; about 0.7 to about 1.2 mm; about 0.8 to about 1 mm. The electrodes have a length between 1 mm and 30 mm. In some embodiments, the electrode length is about 1.2 mm to about 28 mm; about 1.5 mm to about 25 mm; about 1.8 mm to about 20 mm; about 2 mm to about 18 mm; about 2.5 mm to about 15 mm; about 3 mm to about 12 mm; about 3.5 mm to about 10 mm; about 4 mm to about 8 mm; about 4.5 to about 7.5 mm; about 5 to about 7 mm. In preferred embodiments, the electrode length is between 3 mm and 10 mm and the electrode width is between 0.3 mm and 1 mm. In further preferred embodiments, the thickness of the electrodes is 0.2 mm. In yet further preferred embodiments, the electrodes have a length of between 5 mm and 15 mm and a width of 0.5 mm and 1.5 mm. In yet further preferred embodiments, the thickness of the electrodes is 0.1 mm. In other preferred embodiments, the electrodes have a length of between 8 mm and 20 mm and a width of between 0.8 mm and 2 mm.

In some embodiments, the concentration monitor chip has a length of between 1 μm and 5 cm and a width between 1 μm and 3 cm. In some embodiments, the concentration monitor chip has a length of about 1.2 μm to about 4.8 cm, about 1.5 μm to about 4.5 cm, about 2 μm to about 4.2 cm, about 2.5 μm to about 4 cm, about 3 μm to about 3.8 cm, about 5 μm to about 3.5 cm, about 10 μm to about 3 cm, about 15 μm to about 2.5 cm, about 20 μm to about 2 cm, about 30 μm to about 1.5 cm, about 40 μm to about 1 cm, about 50 μm to about 9 mm, about 60 μm to about 7 mm, about 80 μm to about 6 mm, about 90 μm to about 5 mm, about 100 μm to about 4 mm, about 120 μm to about 3 mm, about 150 μm to about 2 mm, about 200 μm to about 1 mm, about 250 μm to about 900 μm, about 300 μm to about 800 μm, about 400 μm to about 700 μm, or about 500 μm to about 600 μm.

In some embodiments, the monitor chip has a width of about 1.2 μm to about 2.8 cm, about 1.5 μm to about 2.5 cm, about 2 μm to about 2 cm, about 2.5 μm to about 1.5 cm, about 3 μm to about 1 cm, about 5 μm to about 8 mm, about 10 μm to about 5 mm, about 15 μm to about 2.5 mm, about 20 μm to about 2 mm, about 30 μm to about 1.5 mm, about 40 μm to about 1 mm, about 50 μm to about 900 μm, about 60 μm to about 800 μm, about 80 μm to about 600 μm, about 90 μm to about 500 μm, about 100 μm to about 400 μm, about 120 μm to about 300 μm, or about 150 μm to about 200 μm.

In some embodiments, the miniature battery-free concentration monitor comprises a galvanic cell generating a current through a reaction with a body fluid, an encapsulated circuit for concentration-adaptive energy harvest, and a wireless data transmission system.

In some embodiments, the external data recorder receives a signal encoded with information of a measured concentration and stores the data into a storage medium. In some embodiments, the external data recorder is capable of displaying the data real-time or daily in profiles of concentrations of at least one analyte on a screen. In some embodiments, the external data recorder also records a user's daily events including, but not limited to, eating and sleeping. Advantageously, the recorded daily events of a user can be associated with a user's metabolism rate that may affect the concentration of a target analyte.

Further provided is a novel method for evaluating the concentration of at least one analyte based on a concentration-adaptive energy harvest principle. Advantageously, the concentration-adaptive energy harvest principle of the invention offers a battery-free analyte concentration monitoring system that can operate for extended detection periods without sacrificing accuracy and enables avoidance of leakage events often associated with battery-operated devices containing toxic materials.

Furthermore, the extended monitoring time period of the monitoring system of the invention provides more data and enables a better analysis of the variation of certain analytes over long periods of time. In some embodiments, the battery-free remote concentration monitor system of the invention measures glucose in a bladder of a subject for the diagnosis and monitoring of diabetes mellitus. In some embodiments, the battery-free remote concentration monitoring system of the invention measures the concentration of hydrogen ions in an esophagus for the diagnosis and monitoring of gastroesophageal reflux disease (GERD). In some embodiments, the battery-free remote concentration monitor system of the invention measures the concentration of lactate in a small intestine for the diagnosis of lactose intolerance.

In some embodiments, the battery-free and wireless concentration monitor of the invention comprises a galvanic cell and an encapsulated circuit. In specific embodiments, the galvanic cell comprises one or more pairs of anodes and cathodes. In embodiments of the invention, when the concentration monitor of the invention comes into contact with a body fluid that contains ions, the cathode undergoes a reduction reaction while an oxidation takes place on the anode. Once contacted with a body fluid, the anode loses electrons and the cathode collects the electrons, thus generating an electrical current. In some embodiments, the current generated by the electron transfer is harvested by an encapsulated circuit that sends signals corresponding to the measured ion concentrations. In specific embodiments, the encapsulated circuit comprises a voltage regulator, a temporary capacitor, and a wireless communication module.

In some embodiments, the galvanic cell further comprises a separate layer to protect the electrodes from being contaminated by an accumulation of debris present in body fluids.

In some embodiments, a semipermeable membrane allowing the passage of negative ions is used to enhance the performance of electrodes.

In some embodiments, the surface of the electrodes is modified by enzyme immobilization and enables enzymatic reactions.

In some embodiments, the surface of the electrodes is colonized by bacteria that catalyze specific analytes, including, but not limited to, *L. caei, L. casei* subst, *L. paracasei* subs, *L. acidophilus, L. bulgaricus* and *L. acidophilus.*

In some embodiments, the encapsulated circuit is a voltage regulation circuit that is an efficient energy-harvest integrated circuit (IC). In specific embodiments, the voltage regulation circuit is a boost converter IC.

In some embodiments, the temporary storage is a capacitor or a super capacitor with capacitance with enough energy to drive a wireless communication module.

In some embodiments, the wireless communication module is a device generating a magnetic field that can be detected by an external recorder.

In some embodiments, the wireless communication module is an amplitude shifting keying (ASK) module or an on-off keying (OOK) module that transmits data with varied amplitude.

In some embodiments, the circuit is encapsulated by a biocompatible material. In specific embodiments, the biocompatible material is polyalkyl siloxane. In further embodiments, the biocompatible material is selected from the group consisting of polymethylsiloxane (PMS), polydimethylsiloxane (PDMS), polyalkoxysiloxane, or polyalkyl arylsiloxane.

In some embodiments, methods for measuring the concentration of specific analytes in body fluids are provided. In specific embodiments, an electric current is generated by the redox reaction that takes place at the interface between the anode and cathode of the galvanic cell of the invention and a body fluid. In further specific embodiments, the encapsulated circuit collects and stores the generated electrical energy in a temporary storage capacitor. As the voltage of the capacitor reaches a pre-programmed threshold, the wireless communication module is activated and sends out a signal to an external recorder.

Advantageously, because the concentration of the analytes determines the charging rate and further determines the frequency of signal transmission, the concentration of an analyte in a body fluid is measured according to the frequency of the pulse signals.

Further provided are systems that comprise a concentration monitor and a portable recorder capable of receiving data from the concentration monitor. In some embodiments, the portable receiver comprises a micro-controller, a screen, a SD card, and a signal detector. In some embodiments, the external receiver detects signals sent from a monitor that is present inside the body of a subject and decodes the in vivo signals into concentration data processed by the microcontroller. In preferred embodiments, the data is stored on the SD card and used to plot a diagram showing the daily profile of concentration data. In some embodiments, other storage devices are used to store the data including, but not limited to, RAM memory, ROM memory, EPROM memory, EEPROM memory, flash memory, registers, hard disk, a CD-ROM and other form of storage medium including storage in the cloud.

In some embodiments, the receiver displays the frequency of the signal in real-time.

In specific embodiments, the portable receiver is capable of recording users' daily activities including, but not limited to, eating and sleeping, which activities affect the metabolic rate and further influence the concentration of target analytes. Advantageously, the recorded activity information combined with the analyte concentration data help users to find a relationship between concentration variation and users' lifestyles.

In some embodiments, the external receiver is portable. In some embodiments, the external receiver is waterproof such that data can be recorded without affecting users' daily activities.

In some embodiments, the remote signal receiver further comprises a dual band transceiver that receives the sub-1 G Hz signal from an in vivo monitor and uploads the data to a medium via a 2.4 G Hz Bluetooth.

In some embodiments, the transceiver is embedded within a wearable device that can be attached on a user's skin.

Further provided are methods for delivering the concentration monitor into a human body. In some embodiments, the concentration monitor is delivered into the GI tract. In preferred embodiments, the concentration monitor is delivered into the esophagus of a human subject.

In some embodiments, the concentration monitor is delivered into the intestine of a human subject. In preferred embodiments, the concentration monitor is delivered into the upper intestine. In other embodiments, the concentration monitor is delivered into the lower intestine. In further embodiments, the concentration monitor is delivered into the colon of a human subject.

In some embodiments, the concentration monitor is delivered into the bladder of a human subject. In other embodiments, the concentration monitor is delivered into the uterus of a human subject. In some embodiments, the concentration monitor is delivered into the vaginal cavity of a human subject.

In some embodiments, the concentration monitor of the invention is delivered into an ear canal of a human subject. In some embodiments, the concentration monitor of the invention is delivered into a cerebral ventricle of a human subject. In some embodiments, the concentration monitor of the invention is delivered into an anus of a human subject.

In some embodiments, the monitor is attached to a tissue of a subject by several hemostasis clips. In some embodiments, the monitor is directly sutured onto a tissue, e.g., an intestine wall. In some embodiments, the monitor is tailored into a capsule-like shape that facilitates the passage through a GI tract of a subject when administered by oral administration.

In preferred embodiments, the monitor is administered by gastrointestinal endoscopic administration. In some embodiments, the concentration monitor is fixed on a wall of a gastrointestinal (GI) tract, guided through the GI tract by a magnetic field or the natural peristalsis of the GI tract.

These embodiments and additional embodiments of the present invention are described in detail below with reference to the accompanying drawings.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Figure 1:
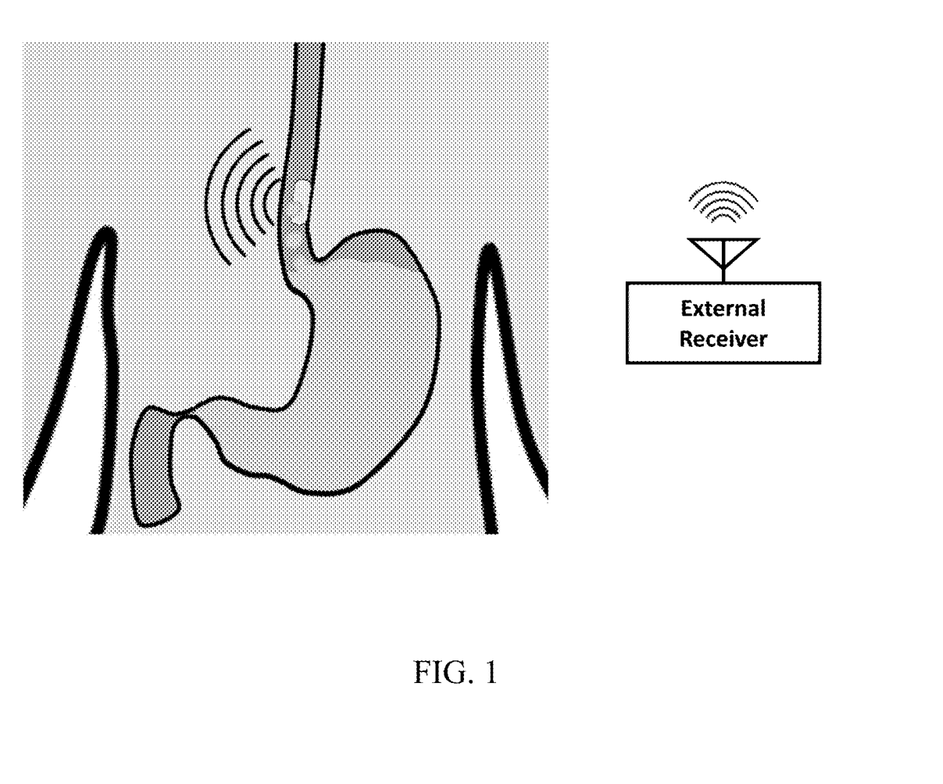
FIG. 1 shows a schematic illustration of the remote monitor system including an untethered battery-free concentration monitor and an external signal receiver.

The present invention provides a novel system that accurately monitors for an extended period of time in real-time the concentration of an analyte in a body fluid. Referring to FIG. 1, the concentration monitor of the invention comprises at least two parts, an untethered battery-free concentration monitor and an external receiver. Based on concentration-adaptive energy harvest principle, the battery-free monitor continuously measures the target analyte concentration long term without any built-in batteries. In some embodiments, the battery-free monitor is used to evaluate the concentration of certain analytes in the GI tract which is full of biomarkers related to a subject's health. The elimination of conventional batteries makes the monitor more compact and safer. The small size of the monitor facilitates the passage through the GI tract and reduces the risk of colon obstruction. To avoid a user's discomfort, the batter-free monitor is untethered, thereby not affecting a user's daily life activities, including eating and drinking. Otherwise, change of daily routines would affect the metabolism rate and affect the concentration of the target analytes in the body fluid. The external receiver detects the signals corresponding to the measured concentration. The built-in micro-computer unit decodes the signal into a concentration and stores the concentration data in a storage medium. In some embodiments, the recorder may display the real-time data or daily profile of concentration on a screen.

Figure 2A:
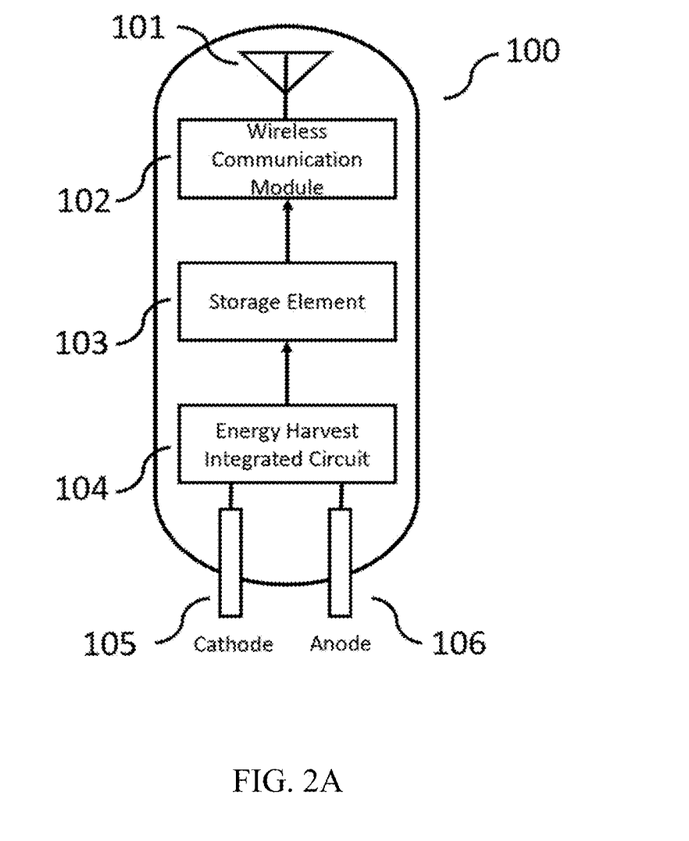
FIG. 2A shows a schematic illustration of the system architecture of an encapsulated circuit of an untethered battery-free concentration monitor which encapsulated circuit comprises a concentration-adaptive voltage regulator, a temporary storage capacitor and a wireless communication module.

Referring to FIG. 2A, the concentration monitor comprises two main functional parts, a body fluid driven galvanic cell generating current and an encapsulated circuit for voltage regulation and wireless communication. The galvanic cell generally comprises one or more pairs of anodes and cathodes. Electrons transfer through the redox reaction between the anode and the cathode. The encapsulated circuit harvests the generated electricity and activates the wireless communication module periodically based on the concentration of the target analytes in the body fluid.

In some embodiments, the concentration monitor is used to measure the pH of gastric acid.

Anodes:

Cathodes:

Based on the above equation, the hydrogen ions are reduced at the cathode while the anode sacrificing electrons is dissolved in the gastric acid. Materials like platinum (Pt), palladium (Pd) and copper (Cu) with high reduction potential are ideal cathodes. The anode should have high negative standard reduction potential to generate electrons with respect to other matters in the gastric acid. In some embodiments, copper and zinc are chosen as cathode and anode, respectively, for low cost and easy fabrication. Once contacted with gastric acid, the anode, e.g., a zinc anode dissolves and loses electrons. The cathode collects the electrons and reduces the hydrogen ions to hydrogen. Because of the electron transfer, a sustainable current is generated between the electrodes. In some embodiments, the electrodes are coated with a semipermeable membrane, e.g., a Nafion film that facilitates the transfer of protons and inhibits short circuit because of direct contact of the anodes and cathodes.

In some embodiments, the target analyte is lactate.

In general, lactic acid is catalyzed to pyruvate by lactate oxidase (LOx) on the anode while oxygen is reduced to water on the cathode. In some embodiments, graphite is chosen as anode for its stability and fast electron transfer rate. Further, LOx is immobilized on the graphite to catalyze the enzymatic reaction. In some embodiments, Ag/AgCl coated with Prussian blue is used as cathode. Ag/AgCl is selected for its stability while Prussian blue minimizes the reduction potential.

In some embodiments, the monitor measures the concentration of glucose for the diagnosis of diabetes.

Generally, glucose is oxidized under the catalysis of glucose oxidase (GOx) on the anode. Meanwhile, oxygen is reduced to water on the cathode. In some embodiments, bacteria capable of producing GOx are colonized on the anode in conducting hydrogels or a chitosan matrix. Commonly, platinum (Pt) is selected as the cathode for its high reduction potential.

Biofouling generally occurring through nonspecific adsorption of various molecules on the electrodes can reduce the specificity and sensitivity. Thus, to inhibit biofouling, the device of the instant invention comprise surface modifications used as antifouling agents. For example, polyethyleneglycol (PEG) is a widely used coating material due to its hydrophilic groups that form a hydration layer blocking undesired biomolecules. Therefore, in some embodiments, the electrodes of the monitor are coated with PEG.

In some embodiments, the coating material is selected from the group consisting of polylactic acid, polyglycolide, polylactic polyglycolic acid copolymers (PLGA), polycaprolactone, poly(dioxanone), poly(trimethylene carbonate) copolymers, polyglyconate, poly(propylene fumarate), poly(ethylene terephthalate), poly(butyleneterephthalate), polyethyleneglycol, polycaprolactone copolymers, polyhydroxybutyrate, polyhydroxyvalerate, tyrosine-derived polycarbonates and any random or (multi-)block copolymers, such as bipolymer, terpolymer, and quaterpolymer.

Referring to FIG. 2A, the encapsulated circuit of the concentration monitor system of the invention comprises a voltage regulation circuit, a temporary storage element and a wireless communication module. In some embodiments, the wireless communication module comprises an oscillator, an on-board antenna and an on/off keying RF transmitter that transmits binary code through a RF signal with varied amplitude. In some embodiments, the wireless communication module is a coil inductor that generates a magnetic field that can be detected by the external signal receiver. In some embodiments, the circuit is fabricated on printed circuit board (PCB) and encapsulated by a biocompatible material selected from polymethylsiloxane (PMS), polydimethylsiloxane (PDMS), polyalkoxysiloxane, and polyalkyl arylsiloxane. In preferred embodiments, the biocompatible material is PDMS. The electrodes made, e.g., of copper and zinc are soldered directly on the PCB.

Figure 2B:
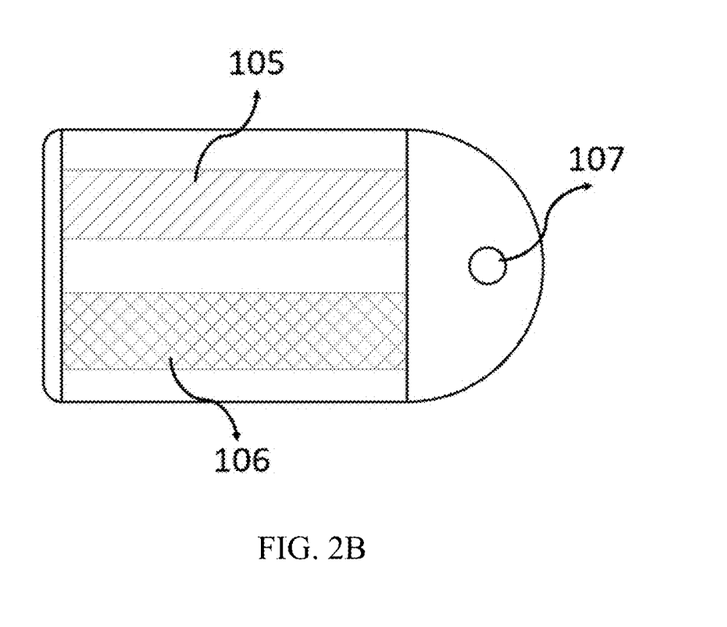
FIG. 2B shows galvanic couples of the untethered battery-free concentration monitor, which galvanic couples are extruded out and attached on the surface of the monitor.

Referring to FIG. 2B, parts of the electrodes extrude out of the PDMS and are exposed to the body fluid. In some embodiments, a micro fluid channel is fabricated in the PDMS shell to sample body fluid.

In some embodiments, the size of the capsule is minimized by rigid-flex PCB fabrication. Each functional module is mounted onto the rigid circular substrates (FR4 board) separately. Each of the rigid boards are stacked layer by layer and connected by flexible substrates (Polyimide). Instead of an on-board antenna, a helical copper antenna wraps the circular stack circuits, which not only provides better omni-direction signal radiation but also makes the capsule more compact, thus, reducing the risk of capsule retention.

In some embodiments, the monitor is used to measure the concentration of certain analytes in the GI tract. To this end, the encapsulated circuit is further tailored into a capsule-like shape to facilitate the passage through the GI tract. In some embodiments, the monitor is delivered by oral administration. The monitor can transit through the esophagus, stomach, small intestine, and colon. The monitor of the invention can record a profile of the concentration of a target analyte to study the variation of target analyte throughout the GI tract.

Figure 3A:
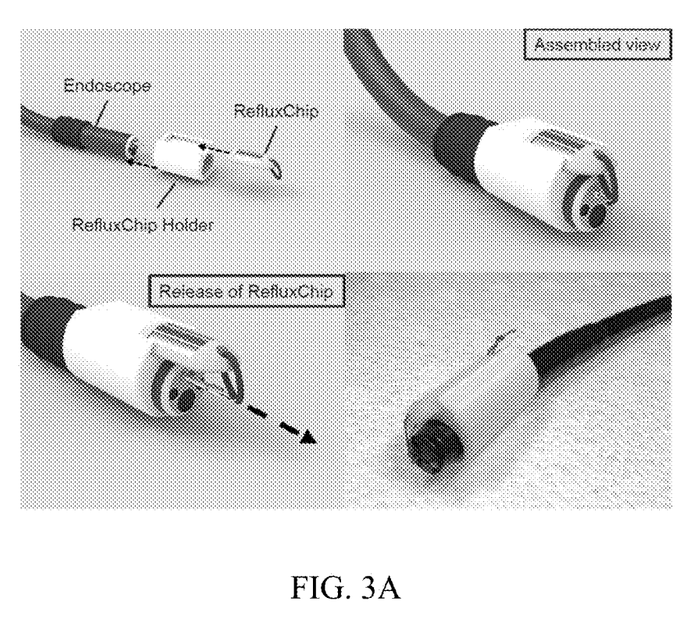
FIG. 3A shows an assembly process for delivering am untethered battery-free concentration monitor into a part of the GI tract comprising mounting the monitor onto a standard endoscope.
Figure 3B:
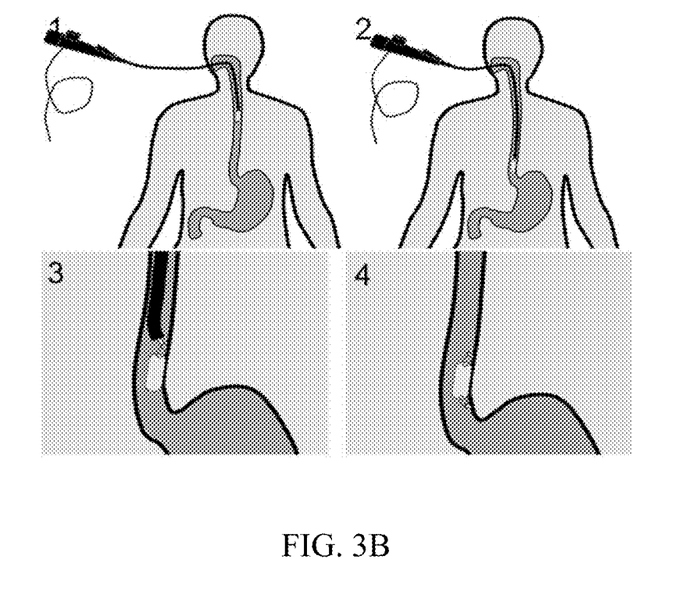
FIG. 3B shows a detailed deployment procedure of fixing the monitor onto a tissue of the GI tract.

In some embodiments, the monitor is fixed on a spot of the body lumen to study the change of a biomarker within a target area. Referring to FIG. 3A, the monitor is mounted onto the distal tip of a standard endoscope by a customized holder. Then, an endoscopy hemostasis clip is inserted through the biopsy hole of the endoscope and tied with the monitor by a surgical suture. FIG. 3B generally shows the delivery procedure. After assembling, the monitor is inserted through the esophagus along with the endoscope. Then, both ends of the monitor are fixed in the esophagus wall by the hemostasis clip in sequence. Eventually, the monitor will detach from the esophagus wall due to tissue growth. In some embodiments, the surgical suture is made of an enteric material that remains intact in gastric acid. After entering the small intestine, the clips disassemble from the monitor due to the degradation of the surgical suture.

In some embodiments, the monitor further comprises a permanent magnet for magnetic control and navigation. The monitor is delivered to a target area by an external magnetic field such as a magnetic field generated by an electromagnet system or an external permanent magnet. In some embodiments, a belt embedded with a permanent magnet is used to attract the monitor within a target area such as the small intestine. In some embodiments, the monitor is directly sutured on the tissue of GI such as the stomach, for the long-term evaluation of a biomarker.

Figure 4:
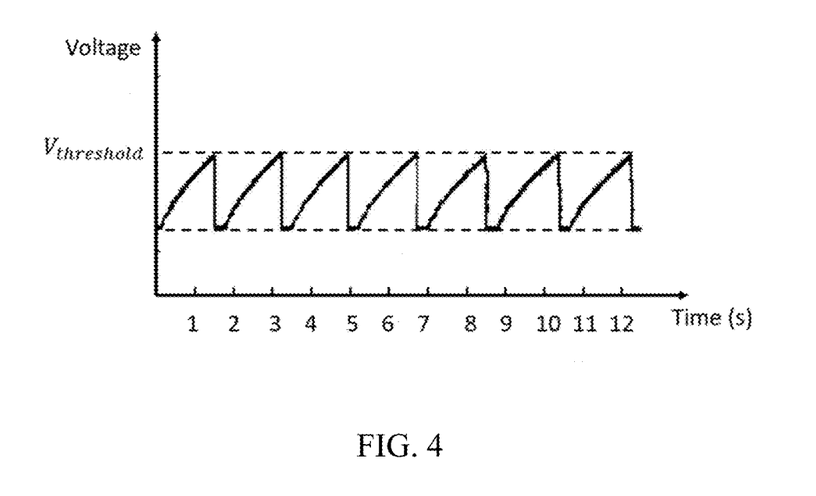
FIG. 4 shows a periodic change of the voltage of a temporary storage capacitor in the encapsulated circuit while the electrodes are immersed in HCl buffer solution.

Referring to FIG. 4, the voltage of the storage capacitor reveals the working principle of the concentration-adaptive voltage regulation circuit. In some embodiments, a redox reaction occurs as both electrodes contact the body fluid. The electrodes generate current proportional to the concentration of target analytes in the body fluid while the potential generated between the two electrodes is constant. Then the concentration-adaptive energy harvest starts to charge the temporary storage capacitor. In one embodiment, a pair of NPN bipolar transistor and a P-type MOSFET serves as a voltage-controlled switch connected between the temporary storage capacitor and the wireless communication module. When the voltage of the storage capacitor reaches the pre-programmed threshold, the wireless signal transmitter is activated and sends a pulse signal to the external receiver. Instantly, the energy stored in the capacitor is consumed, and the voltage drops below the threshold. The wireless signal transmitter is turned off and the capacitor is charged again. The frequency of pulse signal can be described by the following equation:

$$f = \frac{I_{charge}}{C_{store} \times V_{threshold}}$$

Because it takes less time to charge the storage capacitor to a lower threshold decreasing the threshold $V_{threshold}$ increases the frequency that results in a shorter period. But the threshold should be high enough to turn on the switch. Moreover, the capacitance of the temporary capacitor $C_{store}$ also affects the period of the signal. The frequency decreases with increasing capacitance because it takes more time to charge a capacitor with large capacitance to the threshold. In addition, the energy stored in the capacitor should be high enough to drive the wireless communication transmitter. The charge current $I_{charge}$ is positively proportional to the concentration of the target analyte catalyzed in the body fluid. After careful setting of a threshold and selection of a capacitor, the frequency of the signal is only determined by the charge current $I_{charge}$. Therefore, the frequency of a pulse signal can be calibrated to the corresponding concentration of an analyte.

In some embodiments, the encapsulated circuit contains a boost converter circuit, which extracts the energy from galvanic cell and boost the voltage of the temporary storage capacitor to the threshold, and a multimodal micro controller with RF transceiver for wireless communication. A normally open SPST analog switch is connected between the micro controller and the storage capacitor. The micro controller remains in sleep mode when no target analyte is detected. The analog switch turns on when the temporary storage capacitor is charged to a constant voltage. In concentration-adaptive operation, the charging rate is associated with the concentration of target analyte in the body fluid. As the voltage of the capacitor reaches the threshold, the micro controller is woken up and transmits a pulse signal. Accordingly, the measured concentration of the analyte is encoded in the frequency of the RF signal. Once the control signal is transmitted, the voltage of the storage capacitor falls below the threshold. Then, the analog switch turns off and the storage capacitor is charged again.

In some embodiments, the micro controller sends control signals to other components including, but not limited to, drug release systems or electric stimuli systems. In some embodiments, a drug release system contains a microscale motor driven by a pulse signal. Advantageously, the micro controller can send a pulse signal and thus control the rate of drug release according to an analyte concentration. In other embodiments, the electrical power generated by the device of the invention is used to apply electrical stimuli to rehabilitate a weakened muscle.

In some embodiments, the device of the invention uses near-field communication (NFC) technology. Instead of a RF transmitter module, a passive radiofrequency identifier (RFID) is connected with the temporary storage capacitor by a normally open SPST analog switch. As the voltage of the capacitor reaches the threshold, the analog switch turns on. Then the RFID is activated and sends out a signal. In some embodiments, RFID comprises a built-in temperature sensor that also can send signals encoded with temperature information. So, temperature within human body is also obtained.

In some embodiments, the wireless communication module is a coil inductor to eliminate the trade-off between the performance of RF radiation and the sensitivity of the concentration monitor. Specifically, a good performance of RF radiation requires a large capacitor while a relative smaller capacitor leads to better sensitivity. Instead of the RF transmitter module, the coil inductor generates a magnetic field when activated.

Figure 5:
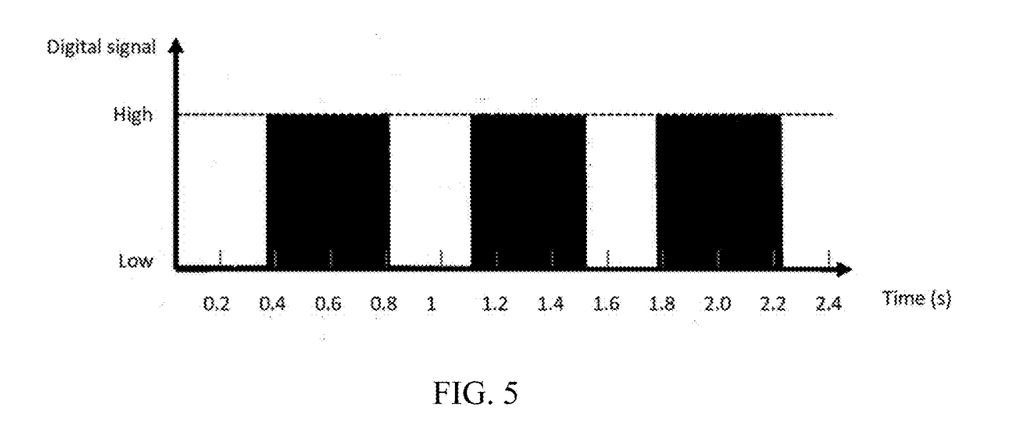
FIG. 5 shows the communication signal between the RF receiver and the micro-controller in the external data recorder.

Referring to FIG. 5, in some embodiments, the microcontroller communicates with the RF receiver by digital signal pin. In one embodiment, the in vivo concentration monitor keeps silent when no analyte is detected and the RF receiver within the portable device sends out random signals. When body fluids containing a target analyte are detected, the monitor transmits a pulse signal to the external receiver. Then, the RF receiver sends a low-level signal lasting about 200 microseconds to the micro-controller. Subsequently, the micro controller decodes this signal into concentration information according to its frequency. In other embodiments, some types of RF receivers send a high-level pulse signal to wake up the micro-controller from sleep mode when they receive the RF signal. Similarly, the micro controller deciphers signals into concentration data according to the signal frequency.

Figure 6:
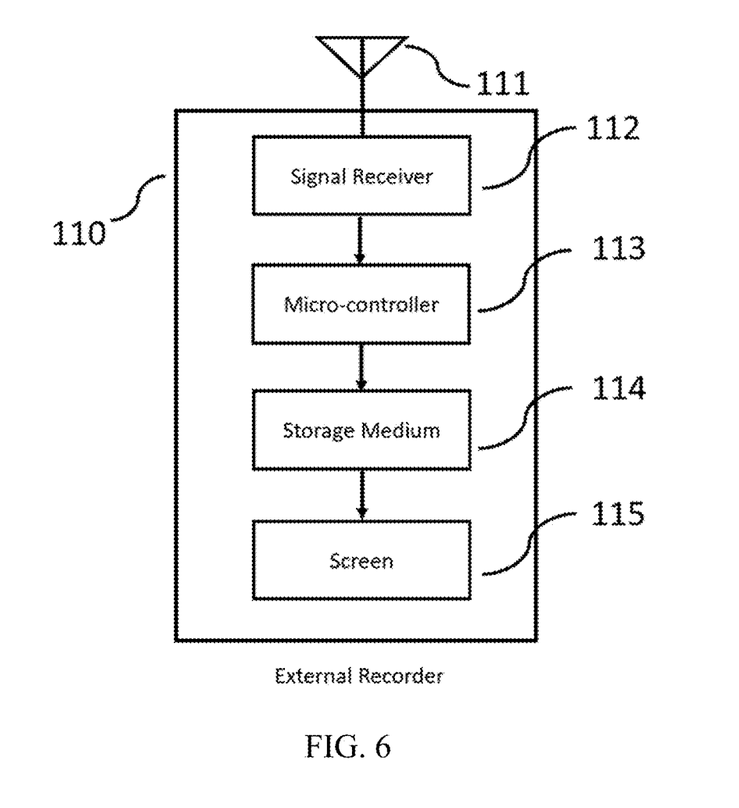
FIG. 6 shows a schematic illustration of a portable receiver that comprises a signal receiver, a storage medium, a micro-controller and a screen.

Referring to FIG. 6, in some embodiments, the portable receiver contains a signal receiver for wireless communication, a micro-controller for signal processing, a SD card for data storage and a screen with user interface. In some embodiments, the portable receiver can plot real-time data on the screen. Moreover, the device can also record and process the data into a diagram which shows the daily profile of a target analyte concentration. In some embodiments, the portable device can record a user's daily events like eating and sleeping. This function helps physicians to find the relationship between the variation of an analyte concentration and a user's lifestyle.

Figure 7:
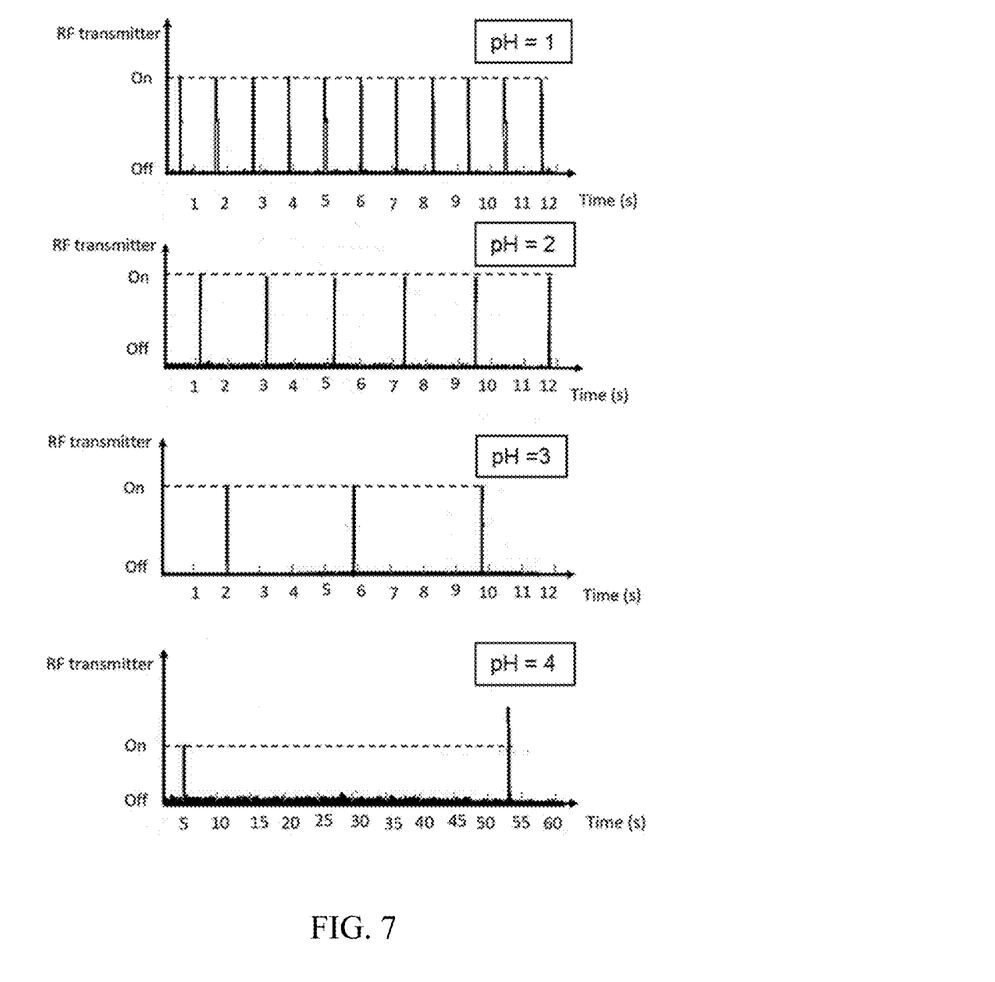
FIG. 7 shows a schematic illustration of RF signals with different frequencies according to pH values from 1 to 4.

Referring to FIG. 7, the remote concentration monitor of the invention is calibrated using in vitro measurements. In some embodiments, an encapsulated prototype with electrodes extruding out is submersed into a hydrochloric (HCl) acid buffer solution with pH values ranging from 1 to 4. The pH value indicates the concentration of hydrogen ions in the solution, which hydrogen ion concentration determines the efficiency of the redox reaction at the electrodes of the concentration monitor. For example, a lower pH value leads to a more active redox reaction resulting in a more efficient energy harvesting. After submersion of the encapsulated prototype, the energy harvest starts to charge the temporary storage capacitor. Since the RF transmitter sends out a signal when the voltage of the storage capacitor reaches the threshold, the frequency of the signal varies according to the pH value as shown in FIG. 7.

Materials and Methods

Non-limiting embodiments of the present invention will be described by means of an example combined with figures, which are schematic and are not intended to be drawn to scale. In the figures, each identical or nearly identical component illustrated is typically represented by a single number. For purposes of clarity, not every component is labelled in every figure, nor is every component of each embodiment of the invention shown where illustration is not necessary to allow those of ordinary skill in the art to understand the invention.

All patents, patent applications, provisional applications, and publications referred to or cited herein are incorporated by reference in their entirety, including all figures and tables, to the extent they are not inconsistent with the explicit teachings of this specification.

Following are examples that illustrate procedures for practicing the invention. These examples should not be construed as limiting. All percentages are by weight and all solvent mixture proportions are by volume unless otherwise noted.

Example 1—Remote Concentration Monitor System

An untethered battery-free concentration monitor and an external receiver were combined to generate a remote concentration monitor system of the invention. The battery-free monitor continuously measures the target analyte concentration for long term without any built-in batteries using a concentration-adaptive energy harvest principle. The battery-free monitor is used, e.g., to evaluate the concentration of certain analytes in GI tract of a subject. The GI tract is full of biomarkers related to person's health and measuring target analytes using the monitor system eliminates the need for conventional batteries and facilitates the passage through the GI tract due to the small size of the monitor and reduces the risk of intestinal obstruction. To avoid users' uncomfortableness, the batter-free monitor is untethered, which does not affect users' daily life, like eating and drinking. Advantageously, no change of daily routines is needed with the monitor of the invention because changes of daily routines can affect the metabolism rate and concentrations of target analytes in body fluid. The external receiver receives signals from the concentration monitor present inside a subject's body, wherein the signals correspond to the measured concentration of at least one analyte. A built-in microcomputer unit of the receiver decodes the signal into a concentration and stores the data in a storage medium. The recorder can also display the real-time data or daily profile of concentration on a screen.

Example 2—Untethered Battery-Free Concentration Monitor

An untethered battery-free concentration monitor of the system of the invention comprises, at least, a body fluid driven galvanic cell generating current and an encapsulated circuit for voltage regulation and wireless communication. The galvanic cell generally comprises one or more pairs of an anode and a cathode. Electrons transfer through the redox reaction between the anode and the cathode. The encapsulated circuit harvests the electricity power and activates the wireless communication module periodically based on the concentrations of the at least one target analyte in the body fluid that is in contact with the galvanic cell. The concentration monitor is used, e.g., to measure the pH of gastric acid.

$$A \rightarrow A^{n+} + ne^-$$ Anodes:

$$2H^+ + 2e^- = H_2$$ Cathodes:

Based on the above equation, the hydrogen ions present in the gastric fluid are reduced at cathode while the anode sacrificing electrons is dissolved in gastric acid. Materials, like platinum (Pt), palladium (Pd) and copper (Cu), with high reduction potential are ideal cathodes. The anode should have a high negative standard reduction potential to generate electrons with respect to other matters in the gastric acid. In some embodiments, copper and zinc are chosen as cathode and anode, respectively, for low cost and easy fabrication. For example, once contacted with gastric acid the zinc anode dissolves and loses electrons, while the cathode collects the electrons and reduces the hydrogen ions to hydrogen. Because of the electron transfer, a sustainable current is generated between the electrodes. In some embodiments, the electrodes are coated with a semipermeable membrane including, but not limited to, a Nafion film that facilitates the transfer of protons and inhibits short circuit due to a direct contact of anodes and cathodes.

Example 3—Untethered Battery-Free Lactate Concentration Monitor

In general, lactic acid is catalyzed to pyruvate by lactate oxidase (LOx) on the anode while oxygen is reduced to water on the cathode:

$$\text{Lactate} + O_2 \xrightarrow{\text{LOx}} \text{Pyruvate} + H_2O_2$$

In one example, graphite was chosen as anode for its stability and fast electron transfer rate. Then LOx was immobilized on the graphite to catalyze the enzymatic reaction. In other examples, Ag/AgCl coated with Prussian blue was used as cathode. Ag/AgCl was selected for its stability while Prussian blue minimizes the reduction potential.

Example 4—Untethered Battery-Free Glucose Concentration Monitor

The monitor of the invention evaluates the concentration of glucose for the diagnosis of diabetes. To this end, glucose was oxidized under the catalysis of glucose oxidase (GOx) on the anode and oxygen was reduced to water on the cathode:

Because some bacteria are capable of producing GOx, the anode was colonized with bacteria in conducting hydrogels or a chitosan matrix. Commonly, platinum (Pt) was selected as cathode due to its high reduction potential.

Example 5—Prevention of Electrode Biofouling

Although biofuel powered cells provide promising solutions in implantable medical devices, electrodes used in biofuel powered cells often suffer from biofouling. Generally, nonspecific adsorption of various molecules on the electrodes reduces specificity and sensitivity. Therefore, several surface modification methods were used as antifouling strategies. For example, polyethyleneglycol (PEG) is a widely used coating because of its hydrophilic group that forms a hydration layer blocking undesired biomolecules. Other materials according to the invention can be used as antifouling agents.

Example 6—Encapsulate Circuit of the Concentration Monitor

The encapsulated circuits of the concentration monitors of the invention contain a voltage regulation circuit, a temporary storage element and a wireless communication module (FIG. 2A). The wireless communication module comprises an oscillator, an on-board antenna and an on/off keying RF transmitter that transmits binary code through RF signals with varied amplitudes. In some examples, the wireless communication module is a coil inductor that generates a magnetic field that can be detected by the external signal receiver. In some examples, the circuit is fabricated on a printed circuit board (PCB) and encapsulated by a biocompatible material including, but not limited to, polydimethylsiloxane (PDMS). Other biocompatible materials used include polymethylsiloxane (PMS), polyalkoxysiloxane, and polyalkyl arylsiloxane.

The electrodes made of, e.g., copper and zins, respectively, are soldered directly on the PCB. Parts of the electrodes extrude out of the PDMS and are exposed to body fluid (FIG. 2B). In some PCBs a micro fluid channel was fabricated in the PDMS shell to sample a body fluid.

The circuit was encapsulated in a small size capsule, whose size could further be minimized by rigid-flex PCB fabrication. Each functional module was mounted onto the rigid circular substrates (FR4 board) separately. Each of the rigid boards was stacked layer by layer and connected by flexible substrates (Polyimide). Instead of an on-board antenna, a helical copper antenna wrapped the circular stack circuits, which not only provided better omni-directional signal radiation but also made the capsule more compact thereby reducing the risk of capsule retention.

When the monitor was used to measure the concentration of certain analytes in the GI tract, the encapsulated circuit was further tailored into a capsule-like shape to facilitate the passage through the GI tract after endoscopic placement of the monitor in the GI tract. In some clinical applications, the monitor was delivered by oral administration. The monitor transited through the esophagus, stomach, small intestine, and colon and recorded a profile of the concentrations of a target analyte, thus, allowing the study of variations of target analytes throughout the GI tract.

Example 7—Fixation of the Concentration Monitor In Vivo

Generally, the monitor of the invention is fixed on a spot of the body lumen to study the change of a biomarker within a target area. To this end, the monitor was mounted onto the distal tip of a standard endoscope by a customized holder. Then, an endoscopy hemostasis clip was inserted through the biopsy hole of the endoscope and tied to the monitor by a surgical suture (FIG. 3A). After assembly, the monitor was inserted through the esophagus along with the endoscope. Both ends of the monitor were fixed at the target site in the esophagus by the hemostasis clip in sequence. Due to tissue growth, the monitor is expected to detach from esophagus after a certain time period. The surgical suture used was made of an enteric material that remains intact in gastric acid. However, if the monitor is inserted in the small intestine the clips generally disassemble from the monitor due to the degradation of the surgical suture.

Some monitors further comprised a permanent magnet for magnetic control and navigation. Such monitors were delivered to target areas by external magnetic fields such as electromagnet systems or external permanent magnets. Further, a belt embedded with a permanent magnet was used to attract the monitor within a target area, e.g., the small intestine. For long-term evaluation of biomarker, the monitor was directly sutured on the tissue of GI, e.g., the stomach.

Example 8—Concentration-Adaptive Voltage Regulation Circuit

Because a redox reaction occurs when both electrodes contact body fluid, the electrodes generate current proportional to the concentration of target analytes in the body fluid while the potential generated between two electrodes is constant. The concentration-adaptive energy harvest starts to charge the temporary storage capacitor. In one embodiment, a pair of NPN bipolar transistor and a P-type MOSFET served as a voltage-controlled switch connected between the temporary storage capacitor and the wireless communication module. When the voltage of the storage capacitor reached a pre-programmed threshold, the wireless signal transmitter was activated and sent a pulse signal to the external receiver. Instantly, the energy stored in the capacitor was consumed and the voltage dropped below the threshold. As a consequence, the wireless signal transmitter was turned off and the capacitor was charged again. The frequency of pulse signal is described by the following equation:

$$f = \frac{I_{charge}}{C_{store} \times V_{threshold}}$$

When the threshold $V_{threshold}$ is decreased, the frequency is increases. Because it takes less time to charge the storage capacitor to a lower threshold, decreasing the threshold results in a shorter period. When adjusting the threshold, it is important to choose a threshold high enough to turn on the switch.

Moreover, the capacitance of the temporary capacitor $C_{store}$ also affects the period of the signal. Because it takes more time to charge a capacitor with large capacitance to the threshold, the frequency decreases with increasing capacitance. In addition, the energy stored in the capacitor should be high enough to drive the wireless communication transmitter. The charge current $I_{charge}$ is positively proportional to the concentration of the target analyte catalyzed in the body fluid. Thus, after careful setting of the threshold and selection of the capacitor, the frequency of the signal is only determined by the charge current $I_{charge}$. Therefore, the frequency of pulse signal can be calibrated to the corresponding concentration of the analyte.

Further, an encapsulated circuit was generated that contained a boost converter circuit that extracted the energy from the galvanic cell and boosted the voltage of the temporary storage capacitor to the threshold. The encapsulated circuit also contained a multimodal micro controller with RF transceiver for wireless communication. The encapsulated circuit further contained a normally open SPST analog switch that was connected between the micro controller and the storage capacitor. The micro controller remained in sleep mode when no target analytes were detected and the analog switch turned on when the temporary storage capacitor was charged to a constant voltage.

In concentration-adaptive operation, the charging rate was associated with the concentration of the target analytes in the body fluid. As the voltage of the capacitor reached the threshold, the micro controller woke up and transmitted a pulse signal. Accordingly, the measured concentration was encoded in the frequency of RF signal. Once the control signal was transmitted, the voltage of storage capacitor fell below the threshold, the analog switch turned off and the storage capacitor was charged again.

In some embodiments, the micro controller sent control signals to other components, like drug release systems or electric stimuli systems. Drug release systems used contained a microscale motor driven by a pulse signal. The micro controller sent a pulse signal and thus controlled the rate of drug release according to the analyte concentration.

In other embodiments, the electrical power generated in the encapsulated circuit was used to apply electrical stimuli to a muscle to rehabilitate a weakened muscle.

In further embodiments, near-field communication (NFC) technology provided another solution. Instead of a RF transmitter module, a passive radiofrequency identifier (RFID) was connected with the temporary storage capacitor by a normally open SPST analog switch. As the voltage of the capacitor reached the threshold the analog switch turned on. Subsequently, the RFID was activated and sent out a signal. In some embodiments, the RFID contained a built-in temperature sensor that also sent signals encoded with temperature information to obtain temperatures within a human body.

Advantageously, the wireless communication module can be made from an inexpensive coil inductor to eliminate the trade-off between the performance of the RF radiation and the sensitivity of the concentration monitor. Specifically, a good performance of the RF radiation required a large capacitor while a relative smaller capacitor led to better sensitivity. Instead of the RF transmitter module, the coil inductor generated a magnetic field when activated.

Example 9—Communication Between Rf Receiver and Micro-Controller

Concentration monitors were generated in which a micro-controller communicated with the RF receiver by digital signal pin. When implanted in vivo, the concentration monitor kept silent when nothing was detected and the RF receiver within the portable device sent out random signals. When body fluids containing target analytes were detected, the monitor transmitted a pulse signal to the external receiver and the RF receiver sent a low-level signal lasting 200 microseconds to the micro-controller. The micro controller decoded this signal into concentration information according to its frequency. In other embodiments, some types of RF receivers were used, which RF receivers sent a high-level pulse signal to wake up the micro-controller from sleep mode when they received the RF signal. The micro controller then deciphered subsequent signals into concentration data according to their frequency.

Example 10—Portable Receiver

The portable receiver used in a concentration monitor contained, e.g., a signal receiver for wireless communication, a micro-controller for signal processing, a SD card for data storage and a screen with user interface (FIG. 6). In some embodiments, the portable receiver plotted real-time data on the screen. Moreover, the device recorded and processed the data into a diagram that showed the daily profile of the target analyte concentration. In some embodiments, the portable device also recorded a user's daily events like eating and sleeping to help physicians determine a relationship between the variation of analyte concentrations and user's lifestyle.

Example 11—Measurement of pH in a Fluid

In vitro experiments for the calibration of the concentration monitors were performed. An encapsulated prototype with electrodes extruding out was submersed into a hydrochloric (HCl) acid buffer solution with pH values ranging from 1 to 4. The pH value indicates the concentration of hydrogen ions in the solution and the concentration of hydrogen ions determines the efficiency of the redox reaction. Therefore, a lower pH value leads to a more active redox reaction which results in a more efficient energy harvesting using the system of the invention. After submersion of the encapsulated prototype, the energy harvest started to charge the temporary storage capacitor. Since the RF transmitter sent out a signal when the voltage of the storage capacitor reached the threshold, the frequency of the signal varied according to the pH value (FIG. 7). Thus, at a higher pH of 4, only two signals were transmitted within a 1-minute time period, while at a lower pH of 1, eleven signals were transmitted in the same time period. These results demonstrated the surprising efficacy of the concentration monitor system of the invention to measure the pH of a fluid.

EXEMPLARY EMBODIMENTS

Embodiment 1. A remote concentration monitor system comprising:

an untethered battery-free concentration monitor comprising one or more pairs of anodes and cathodes attached on a surface of the monitor and an encapsulated circuit powered by energy harvested from a body fluid through the electrodes; and an external data recorder configured to receive data from the concentration monitor.

Embodiment 2. The remote concentration monitor system of Embodiment 1, wherein the monitor is present inside a subject including, but not limited to, a mammal including, but not limited to, a human a pig, or a monkey.

Embodiment 3. The remote concentration monitor system of Embodiment 1, wherein the external data recorder receives data from inside the subject.

Embodiment 4. The remote concentration monitor system of Embodiment 1, wherein the electrodes are made from biocompatible materials that catalyze a redox reaction thereby generating a current once contacted with the body fluid.

Embodiment 5. The remote concentration monitor system of Embodiment 1, wherein the electrodes are modified by immobilization of enzymes that catalyze an enzymatic reaction thereby generating a current.

Embodiment 6. The remote concentration monitor system of Embodiment 1, wherein the electrodes are colonized by bacteria that catalyze a specific analyte that generates a current.

Embodiment 7. The remote concentration monitor system of Embodiment 1, wherein the electrodes are coated with a semipermeable membrane to facilitate electron transfer.

Embodiment 8. The remote concentration monitor system of Embodiment 1, wherein the electrodes are coated with an anti-biofouling layer to protect the electrodes from being contaminated by debris in the body fluid.

Embodiment 9. The remote concentration monitor system of Embodiment 1, wherein the electrodes are attached on the surface of the monitor and electrically connected with the encapsulated circuit.

Embodiment 10. The remote concentration monitor system of Embodiment 1, wherein the encapsulated circuit is sealed with at least one biocompatible material.

Embodiment 11. The remote concentration monitor system of Embodiment 10, wherein the biocompatible material is selected from the group consisting of polymethylsiloxane (PMS), polydimethylsiloxane (PDMS), polyalkoxysiloxane, and polyalkyl arylsiloxane.

Embodiment 12. The remote concentration monitor system of Embodiment 1, wherein the encapsulated circuit further comprises a micro-fluid channel to sample the body fluid.

Embodiment 13. The remote concentration monitor system of Embodiment 1, wherein the encapsulated circuit has a capsule-like shape to facilitate passage of the encapsulated circuit through a gastrointestinal (GI) tract.

Embodiment 14. The remote concentration monitor system of Embodiment 1, wherein the encapsulated circuit comprises:
a concentration-adaptive energy harvest circuit;
a wireless communication module; and
a storage element selected from a capacitor and a super-capacitor.

Embodiment 15. The remote concentration monitor system of Embodiment 14, wherein the wireless communication module is a radio frequency (RF) transmitter selected from an amplitude shifting keying (ASK) RF module and an on-off keying (OOK) RF module.

Embodiment 16. The remote concentration monitor system of Embodiment 15, wherein the frequency transmitted by the RF transmitter is of a RF signal range within an industrial, a scientific, and a medical (ISM) band.

Embodiment 17. The remote concentration monitor system of Embodiment 14, wherein the wireless communication module is a near field communication (NFC) module like a radiofrequency identifier (RFID).

Embodiment 18. The remote concentration monitor system of Embodiment 14, wherein the wireless communication module is a wireless micro-computer unit (MCU) embedded with a RF transceiver.

Embodiment 19. The remote concentration monitor system of Embodiment 14, wherein the wireless communication module is a magnetic field modulator comprising a coil inductor that generates a magnetic field when current passes through.

Embodiment 20. The remote concentration monitor system of Embodiment 14, wherein the concentration-adaptive energy harvest circuit regulates the voltage generated between the electrodes to a typical voltage to drive the wireless communication module.

Embodiment 21. The remote concentration monitor system of Embodiment 14, wherein the wireless communication module sends a signal of a frequency that encodes information of the concentration of at least one target analyte.

Embodiment 22. The remote concentration monitor system of Embodiment 14, wherein the wireless communication module further comprises an antenna selected from an on-board PCB antenna, a helical wire antenna, and a ceramic chip antenna.

Embodiment 23. The remote concentration monitor system of Embodiment 1, wherein the external data recorder is portable and comprises a micro-controller, a screen, an antenna, a storage medium, a battery and a signal receiver.

Embodiment 24. The remote concentration monitor system of Embodiment 23, wherein the micro-controller decodes a frequency of a signal into data of a concentration of an analyte and stores the data in the storage medium.

Embodiment 25. The remote concentration monitor system of Embodiment 24, wherein the storage medium is a SD card.

Embodiment 26. The remote concentration monitor system of Embodiment 24, wherein the screen displays the data of the concentration of the analyte in real-time and shows a daily profile of the concentration of the analyte.

Embodiment 27. The remote concentration monitor system of Embodiment 2, wherein the untethered battery-free concentration monitor is fixed on a wall of a gastrointestinal (GI) tract, guided through the GI tract by a magnetic field or the natural peristalsis of the GI tract.

Embodiment 28. The remote concentration monitor system of Embodiment 27, further comprising a permanent magnet that is controlled by an external permanent magnet or an electromagnet system.

Embodiment 29. The remote concentration monitor system of Embodiment 1, wherein the untethered battery-free concentration monitor is delivered through a GI tract by oral administration.

Embodiment 30. The remote concentration monitor system of Embodiment 1, wherein the untethered battery-free concentration monitor is sutured on a tissue of a GI tract by an endoscope.

Embodiment 31. The remote concentration monitor system of Embodiment 1, wherein the untethered battery-free concentration monitor is attached onto a tissue of a GI tract by an endoscopic clip.

Embodiment 32. The remote concentration monitor system of Embodiment 31, wherein the untethered battery-free concentration monitor is inserted into a customized accessory connected with an endoscope to be deployed by the endoscopic hemostasis clip.

Embodiment 33. The remote concentration monitor system of Embodiment 1, wherein the encapsulated circuit further comprises a pulse generator to apply electrical stimuli on a tissue of a GI.

Embodiment 34. The remote concentration monitor of Embodiment 1, wherein the encapsulated circuit further comprises a light emitter diode (LED) for photodynamic therapy.

Embodiment 35. The remote concentration monitor of Embodiment 1, wherein the external data recorder further comprises a dual band RF transceiver that uploads data to a medium via Bluetooth.

Embodiment 36. The external data recorder of Embodiment 23, wherein the battery supports the recorder to operate for more than one week.

Embodiment 37. The external data recorder of Embodiment 23, wherein the battery is rechargeable by cable wire or wireless power transfer.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

We claim:

1. A remote concentration monitor system comprising: an untethered battery-free remote concentration monitor comprising one or more pairs of anode and cathode electrodes attached on a surface of the remote concentration monitor and configured to generate a current when contacting a gastric acid of a subject, a capacitor configured to be charged by the generated current, an encapsulated circuit configured to be powered by energy harvested from the gastric acid through the one or more pairs of anode and cathode electrodes, wherein the remote concentration monitor is configured to be temporarily fixed in an esophagus wall of the subject by endoscopic administration; and a waterproof external data recorder configured to receive radio frequency pulse signals generated by using the gastric acid to charge the capacitor that discharges upon reaching a voltage threshold, wherein a frequency of these pulse signals is determined by a charging rate of the capacitor, which varies according to a concentration of the gastric acid, wherein a decoded frequency of the pulse signals embodies the concentration of the gastric acid; wherein the waterproof external data recorder further comprises a signal receiver, a micro controller, a data storage medium, and a screen, wherein the untethered battery-free remote concentration monitor is configured to be inside a body of the subject, wherein the micro controller is configured to be in sleep mode when no gastric acid is detected in an esophagus of the subject, wherein the remote concentration monitor is configured to be powered by energy harvested from the gastric acid in the esophagus of the subject at pH values ranging from 1 to 4, wherein the micro controller is configured to wake up and transmit pulse signals when the charging rate of the capacitor reaches the voltage threshold, and wherein the current generated by the one or more pairs of anode and cathode electrodes is positively proportional to the concentration of the gastric acid, wherein the waterproof external data recorder is configured to receive data from inside the body of the subject, to record the concentration of the gastric acid in the data storage medium, and to display real-time gastric acid concentration and GERD severity on the screen, wherein the waterproof external data recorder is configured to be portable.

2. The remote concentration monitor system of claim 1, wherein the remote concentration monitor is configured to be fixed in the esophagus wall of the subject including, but not limited to, a mammal including, but not limited to, a human, a pig, or a monkey.

3. The remote concentration monitor system of claim 1, wherein the encapsulated circuit further comprises:
a gastric acid concentration-adaptive circuit, wherein the gastric acid concentration is transmitted based on the different charging times of power storage caused by varying concentration of gastric acid;
a signal transmitter; and
a power storage element.

4. The remote concentration monitor system of claim 1, wherein the screen is configured to display the data of the concentration of the gastric acid in real-time and show the concentration of the gastric acid in the esophagus of the subject.

5. The remote concentration monitor system of claim 3, wherein the gastric acid concentration-adaptive circuit is configured to store energy generated from the one or more pairs of anode and cathode electrodes in the power storage element and supply energy to the signal transmitter to send the radio frequency pulse signals with different frequencies when a voltage of the power storage element changes.

6. The remote concentration monitor system of claim 1, wherein the remote concentration monitor is fixed in the esophagus wall of the subject until it detaches from the subject due to natural tissue growth.

7. The remote concentration monitor system of claim 1, wherein the one or more pairs of anode and cathode electrodes are electrically coupled with the remote concentration monitor.

8. The remote concentration system of claim 1, wherein different concentrations of gastric acid result in differential charging times for the remote concentration monitor, wherein each time the remote concentration monitor is fully charged, it sends a high-level pulse signal to discharge, wherein the different concentrations of the gastric acid are reflected through different pulse frequencies using on-off keying modulation.

9. A method of delivering the remote concentration monitor system of claim 1 inside a subject, comprising,
connecting the untethered battery-free remote concentration monitor with an endoscope by a holder;
inserting the endoscope into the subject;
fixing the remote concentration monitor to the subject;

retrieving the endoscope and the holder out of the subject; and detaching the remote concentration monitor from the subject.

10. The method of claim 9, wherein the remote concentration monitor is mounted to the holder that is mounted on the endoscope.

11. The method of claim 9, wherein the remote concentration monitor is inserted through a lumen of the subject.

12. The method of claim 11, wherein the lumen of the subject is the gastrointestinal tract.

13. The method of claim 9, wherein the remote concentration monitor is fixed to the gastrointestinal tissue of the subject by a plurality endoscope clips.

* * * * *